US008972924B2

(12) United States Patent
Nishimura et al.

(10) Patent No.: US 8,972,924 B2
(45) Date of Patent: Mar. 3, 2015

(54) METHOD FOR CHANGING STRING ARRANGEMENT, RECORDING MEDIUM FOR STRING ARRANGEMENT CHANGING PROGRAM, AND INFORMATION PROCESSOR

(71) Applicant: Fujitsu Limited, Kawasaki (JP)

(72) Inventors: Kenichi Nishimura, Kawasaki (JP); Minoru Yabumoto, Kawasaki (JP); Naoto Toda, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 231 days.

(21) Appl. No.: 13/713,633

(22) Filed: Dec. 13, 2012

(65) Prior Publication Data
US 2013/0198667 A1 Aug. 1, 2013

(30) Foreign Application Priority Data
Jan. 30, 2012 (JP) ................................ 2012-016469

(51) Int. Cl.
| | | |
|---|---|---|
| *G06F 17/50* | (2006.01) | |
| *G06F 3/0484* | (2013.01) | |
| *G06Q 30/00* | (2012.01) | |
| *G06F 17/21* | (2006.01) | |
| *G06F 17/24* | (2006.01) | |

(52) U.S. Cl.
CPC .......... *G06F 3/0484* (2013.01); *G06F 2217/02* (2013.01); *G06F 2217/06* (2013.01); *G06F 17/5045* (2013.01); *G06F 17/218* (2013.01); *G06F 17/212* (2013.01); *G06F 2217/04* (2013.01); *G06F 17/241* (2013.01); *G06F 17/5004* (2013.01); *G06Q 30/00* (2013.01)
USPC .............................. 716/139; 716/102; 703/14

(58) Field of Classification Search
CPC ... G06F 17/212; G06F 17/218; G06F 17/241; G06F 17/5004; G06F 17/5045; G06F 2217/02; G06F 2217/04; G06F 2217/06
USPC ..................................... 716/139, 102; 703/14
See application file for complete search history.

(56) References Cited

U.S. PATENT DOCUMENTS

| | | | | |
|---|---|---|---|---|
| 5,442,741 | A * | 8/1995 | Hughes et al. | 345/442 |
| 8,817,028 | B2 * | 8/2014 | Yadav et al. | 345/474 |
| 2005/0269870 | A1 * | 12/2005 | Ohashi et al. | 303/20 |
| 2009/0118998 | A1 * | 5/2009 | Chau et al. | 701/120 |
| 2009/0130538 | A1 * | 5/2009 | Kaita et al. | 429/50 |
| 2010/0201684 | A1 * | 8/2010 | Yadav et al. | 345/420 |
| 2011/0299564 | A1 * | 12/2011 | Leutheuser et al. | 374/134 |
| 2014/0306956 | A1 * | 10/2014 | Yadav et al. | 345/420 |

FOREIGN PATENT DOCUMENTS

JP 7-37116 2/1995

* cited by examiner

*Primary Examiner* — Phallaka Kik
(74) *Attorney, Agent, or Firm* — Staas & Halsey LLP

(57) ABSTRACT

A method for changing, by using a computer, an arrangement of strings that are arranged along an inner periphery of a graphic and partially overlap one another is offered. The computer arranges the strings in a radial pattern from a reference point determined within the graphic, determines whether overlapping strings are present, and moves the reference point in a direction to separate from the overlapping strings when the computer determines that the overlapping strings are present.

11 Claims, 9 Drawing Sheets

METHOD FOR CHANGING STRING ARRANGEMENT, RECORDING MEDIUM FOR STRING ARRANGEMENT CHANGING PROGRAM, AND INFORMATION PROCESSOR

CROSS-REFERENCE TO RELATED APPLICATION

This application is based upon and claims the benefit of priority of the prior Japanese Patent Application No. 2012-016469, filed on Jan. 30, 2012, the entire contents of which are incorporated herein by reference.

FIELD

The embodiments discussed herein are related to a method for changing string arrangement, a recording medium for a string arrangement changing program, and an information processor.

BACKGROUND

In computer aided design (CAD) systems and the like, there are techniques in which, of the strings displayed within a drawing, superimposed strings are rearranged.

For example, there is a technique in which, when a target string is rearranged, whether another string or graphic information is present in a superimposing region is checked; if such a string or information is present, a rectangular rearrangement region that does not overlap with the arrangement position of which string or information is obtained, and the target string is translated to the obtained region.

There is another technique in which at least one of the character attributes of a target string, such as the size, spacing, inclination, and expansion direction, is changed, and then the target string is arranged.

For example, there may be a method for providing the shape and symbol pin positions (actual pin positions) of a rectangular circuit symbol that are equivalent to the shape of an actual part and writing signal names in the symbol pin positions.

Because of the form of the circuit symbol, the signal names arranged at each of the four corners may overlap one another. In this case, if the size of each signal name is decreased, the visibility of the signal names reduces. If the display positions of the signal names are moved using leader lines, the circuit symbol becomes complicated.

Japanese Laid-open Patent Publication No. 07-37116 is an example of related art.

SUMMARY

According to an aspect of the invention, a method for changing, by using a computer, an arrangement of strings that are arranged along an inner periphery of a graphic and partially overlap one another is offered. The computer arranges the strings in a radial pattern from a reference point determined within the graphic, determines whether overlapping strings are present, and moves the reference point in a direction to separate from the overlapping strings when the computer determines that the overlapping strings are present.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Information processors of embodiments are described below in detail with reference to the accompanying drawings.

First Embodiment

An information processor of a first embodiment performs processing for changing the arrangement of partially overlapping signal names (strings) within a rectangular circuit element model (circuit symbol) contained in a circuit diagram of a circuit under design. The circuit element model may be, for example, a central processing unit (CPU), application specific integrated circuit (ASIC), or the like.

First, the processing of the information processor of the first embodiment is described using a following method.

Figure 1:
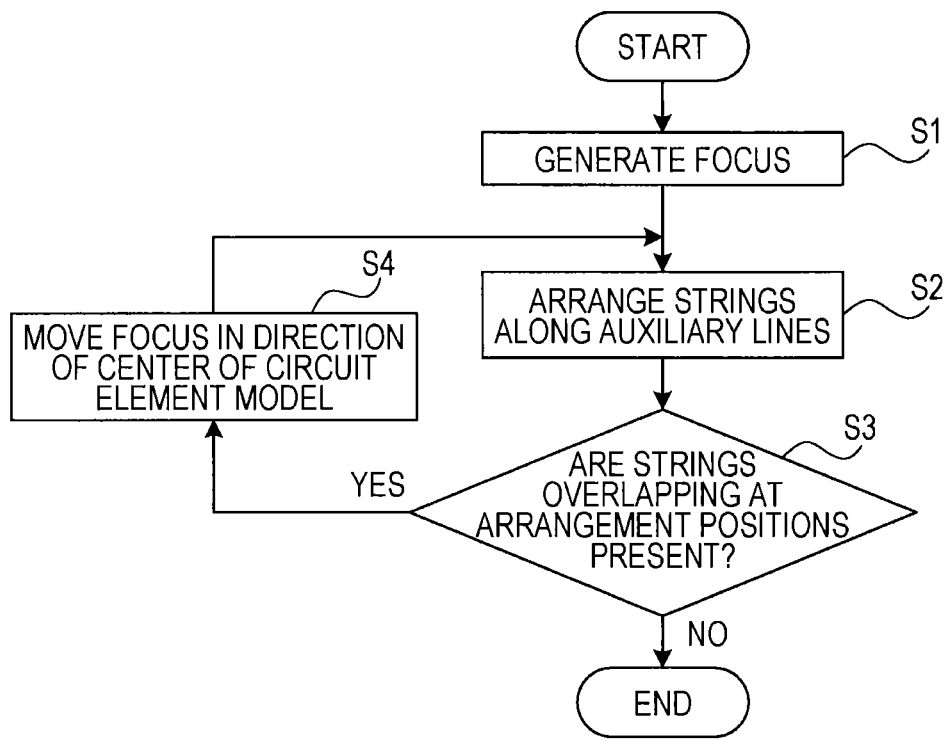
FIG. 1 is a method illustrating processing of an information processor of a first embodiment.

FIG. 1 is a method illustrating the processing of the information processor of the first embodiment.

Step S1: The information processor sets a guideline on a diagonal line of a circuit element model and generates a focus on the set guideline. Then, the information processor proceeds to step S2.

Step S2: The information processor sets an auxiliary line from each string to the focus and arranges the strings along the set auxiliary lines. Accordingly, the strings are arranged in a radial pattern from the focus. Then, the information processor proceeds to step S3.

Step S3: The information processor determines whether strings that overlap at the arrangement positions are present. If such strings are present (Yes to step S3), the information processor proceeds to step S4. If no such strings are present (No to step S3), the information processor terminates the processing illustrated in FIG. 1.

Step S4: The information processor moves the focus in the direction of the center of the circuit element model by a predefined distance. Then, the information processor proceeds to step S2.

When the processing illustrated in FIG. 1 is performed, string movements and interference adjustments can be made at the same time. Overlaps in the strings can therefore be removed in a simple manner. The functions of the information processor that performs the processing illustrated in FIG. 1 are described below in detail.

Figure 2:
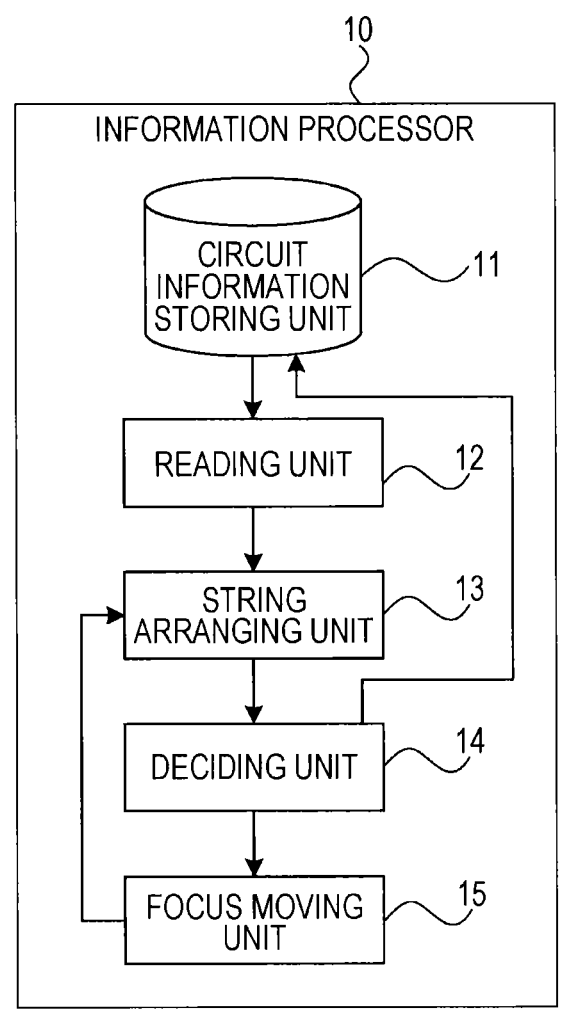
FIG. 2 is a block diagram illustrating the functions of the information processor of the first embodiment.

FIG. 2 is a block diagram illustrating the functions of the information processor of the first embodiment.

An information processor 10 includes a circuit information storing unit 11, a reading unit 12, a string arranging unit 13, a deciding unit 14, and a focus moving unit 15.

The circuit information storing unit 11 stores a circuit diagram of a circuit under design.

Figure 3:
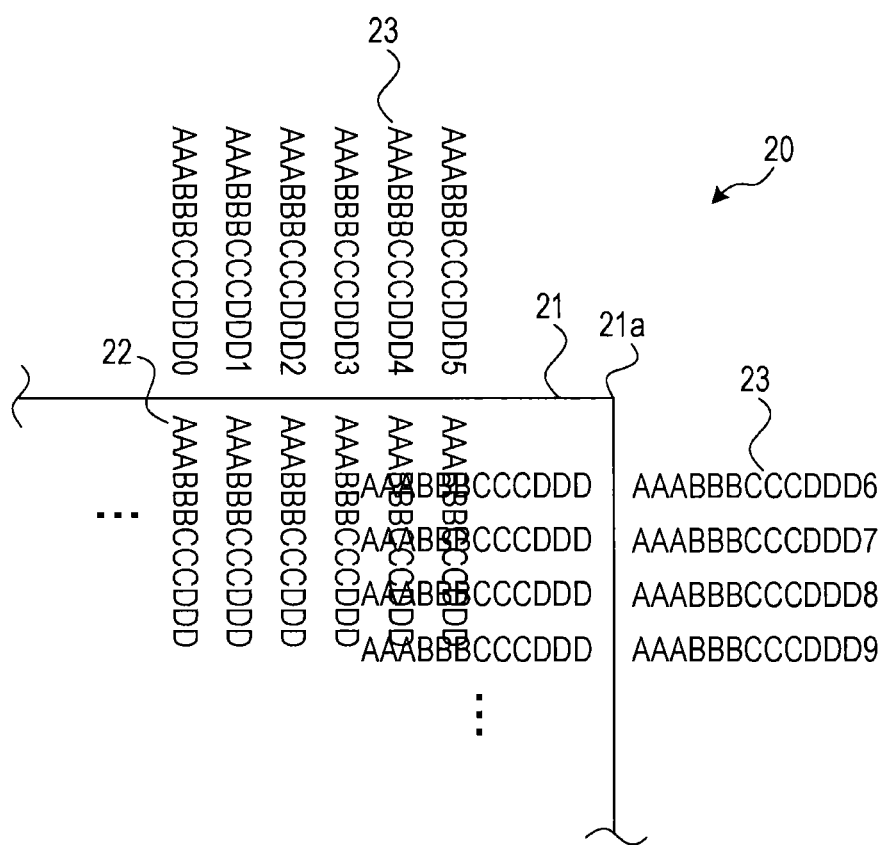
FIG. 3 is an example circuit diagram of a circuit under design.

FIG. 3 is an example circuit diagram of a circuit under design.

A circuit diagram 20 contains a rectangular circuit element model 21. On the inside of the circuit element model 21, strings 22 indicating signal pin names of the circuit element model 21 are placed at equal spaces. The strings 22 are formed perpendicularly to the sides of the circuit element model 21. The strings 22 positioned on the periphery of an edge 21a of the circuit element model 21 overlap one another. On the outside of the circuit element model 21, strings 23 identifying the names and pin numbers of the signal pins are placed at equal spaces.

If the overlapping strings 22 are arranged on the outside of the circuit element model 21, it becomes difficult to distinguish the strings 22 from the strings 23 that have been arranged on the outside of the circuit element model 21, causing a reduction in the visibility.

The information processor 10 uses a method below to radially arrange the overlapping strings 22, and other strings 22 that are moved as the overlapping strings 22 are moved.

Figure 4:
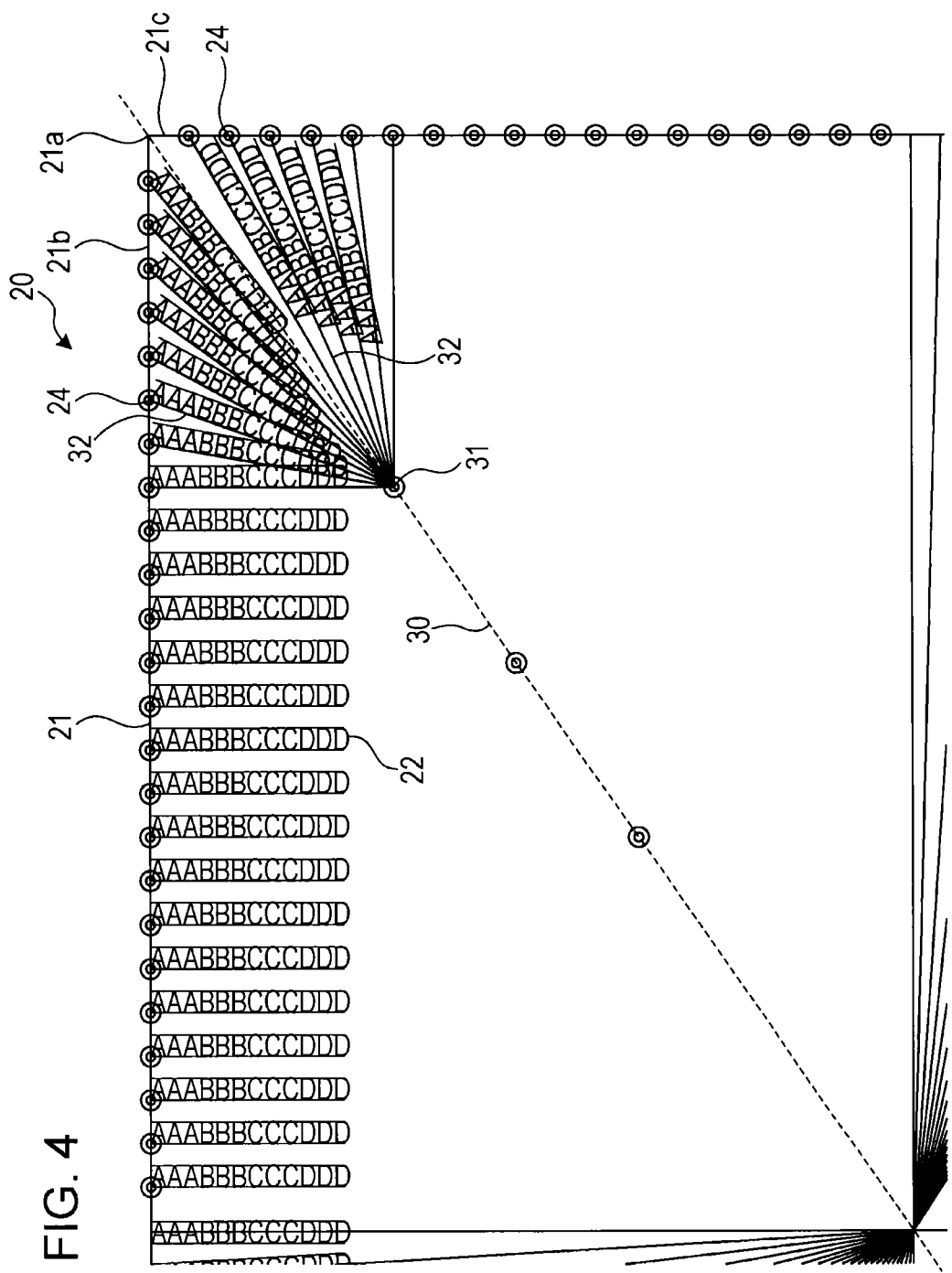
FIG. 4 illustrates string movements.
Figure 5:
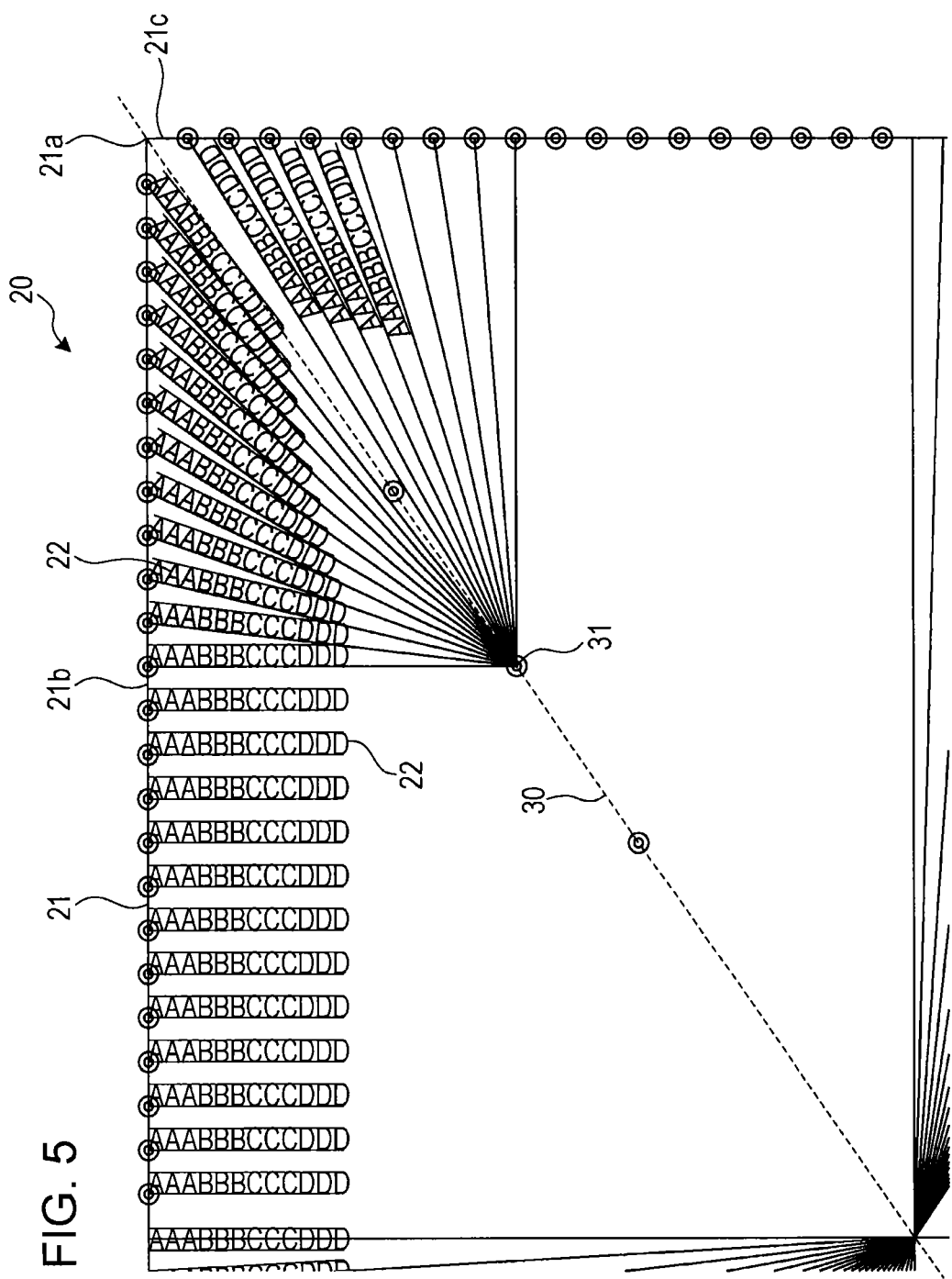
FIG. 5 illustrates string movements.
Figure 6:
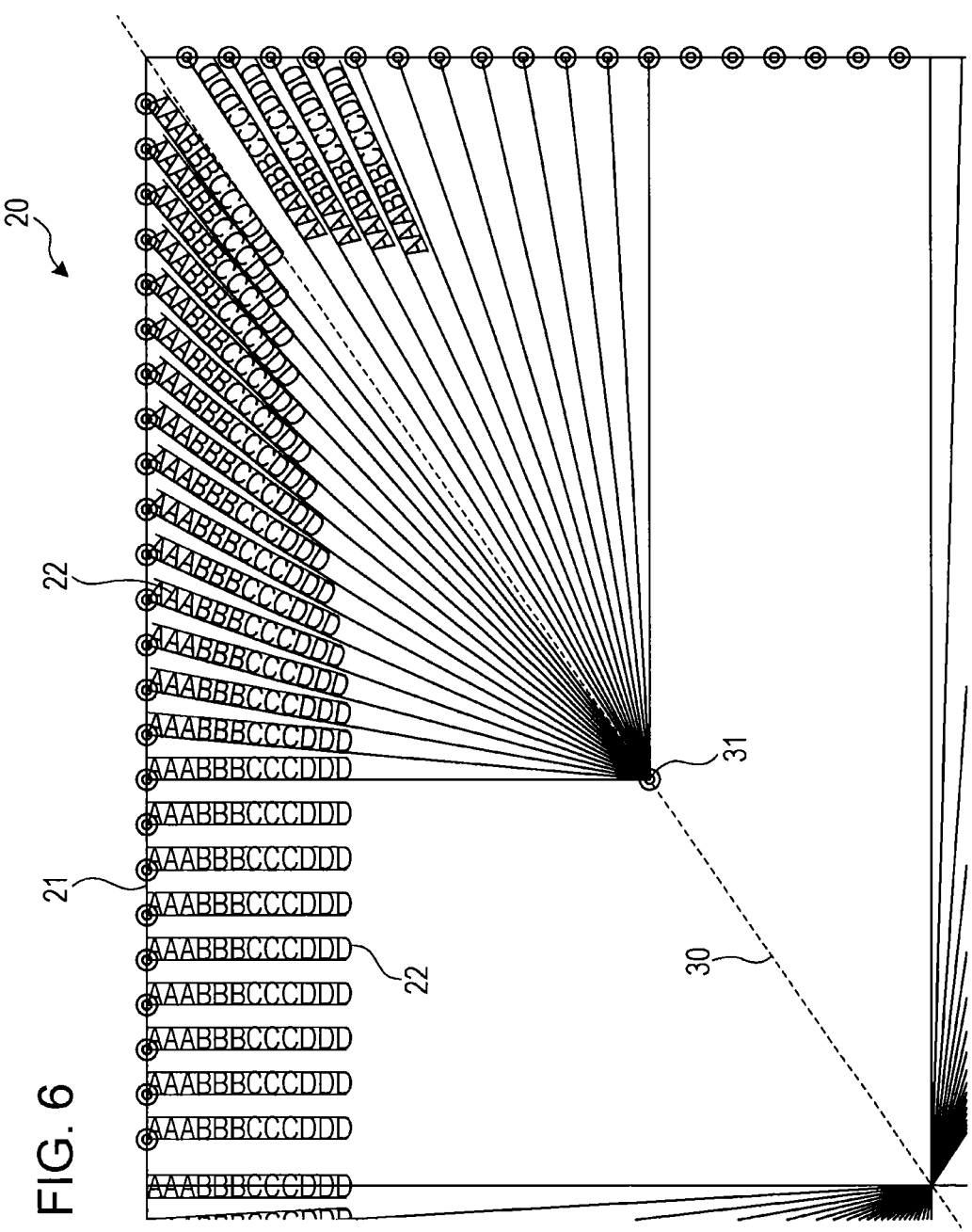
FIG. 6 illustrates string movements.

FIGS. 4 to 6 illustrate string movements. In FIGS. 4 to 6, the indication of the strings 23 on the outside of the circuit element model 21 is omitted.

The reading unit 12 reads the circuit diagram 20 stored in the circuit information storing unit 11.

The string arranging unit 13 sets a guideline 30 on a diagonal line of the circuit element model 21. Then, the string arranging unit 13 sets a focus (reference point) 31 on the set guideline 30. The initial position of the focus 31 is not particularly limited; for example, the initial position may be set on a contact point of a line drawn vertically or horizontally from the closest string 22 to the edge 21a of the circuit element model 21 and the guideline 30.

Next, the string arranging unit 13 sets an auxiliary line 32 from a contact point 24 of each string 22 and a side 21b or a side 21c of the circuit element model 21 to the focus 31, and arranges (inclines) the strings 22 along the set auxiliary lines 32. This processing arranges the strings 22 in a radial pattern from the focus 31. The contact point 24 is an example of a base point that corresponds to each string 22.

Then, the deciding unit 14 checks the strings 22 for overlaps. It is preferable to check the strings 22 for overlaps within the range of a rectangle formed by the focus 31, contact points of the perpendicular lines from the focus 31 and the sides 21b and 21c of the circuit element model 21, and the edge 21a. Consequently, the number of strings that are checked for overlaps can be reduced. Whether there are overlaps in the strings 22 can be decided by, for example, checking overlaps in character occupation regions derived from the character height (vertical length), the number of characters, and the character spacing.

If the strings 22 overlap one another, the focus moving unit 15 moves the focus 31 in the direction of the center of the circuit element model 21 by a predefined distance. In this case, the string arranging unit 13 rearranges the strings 22 along the set auxiliary lines 32.

FIG. 6 illustrates the circuit diagram 20 from which the string overlaps have been removed. When the overlaps in the strings 22 are removed, the circuit diagram 20 with no overlaps in the strings 22 is stored in the circuit information storing unit 11 by the deciding unit 14.

In this embodiment, the processing is terminated when all string overlaps are removed. However, the processing may be terminated when overlaps in character occupation regions are removed to some extent (when the value of an area of the overlaps in the character occupation regions falls to a predefined value or below). This can also be expected to have a certain effect of improving the visibility.

In this embodiment, the direction of a movement of the focus 31 is along a diagonal line of the circuit element model 21, but this is not a limitation. For example, the focus 31 may be moved along a line drawn in any direction from the edge 21a used as a starting point. In this embodiment, the focus moving unit 15 moves the focus 31, but a designer may move the focus 31 using a keyboard 105a or a mouse 105b.

Next, the hardware configuration of the information processor of the first embodiment is described.

Figure 7:
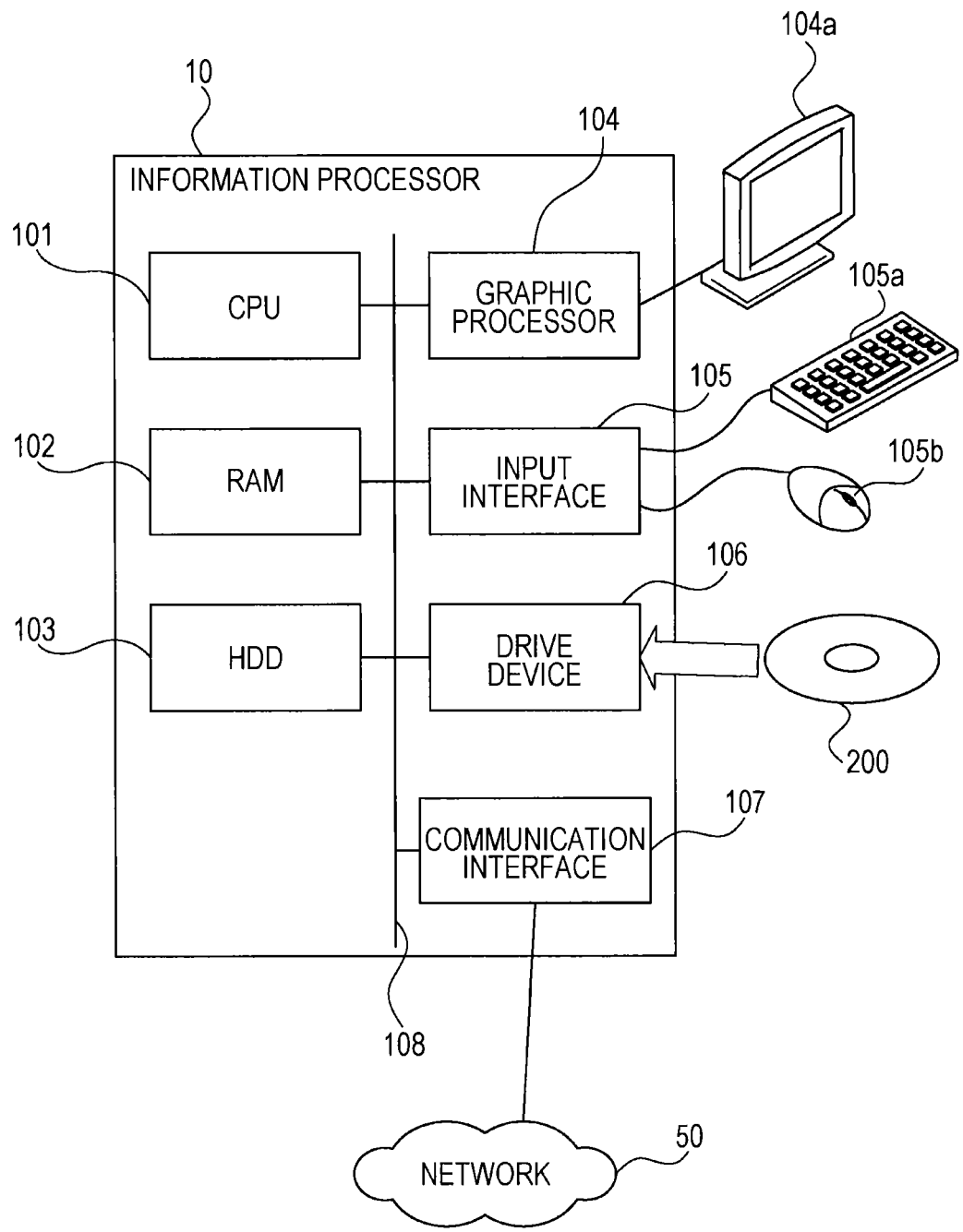
FIG. 7 illustrates the hardware configuration of the information processor of the first embodiment.

FIG. 7 illustrates the hardware configuration of the information processor of the first embodiment.

A CPU 101 controls the whole of the information processor 10. A random access memory (RAM) 102 and a plurality of peripherals are connected to the CPU 101 via a bus 108.

The RAM 102 is used as a main storage device for the information processor 10. The RAM 102 temporarily stores at least part of an operating system (OS) program and an application program that are run by the CPU 101. In addition, the RAM 102 stores various types of data for use with processing by the CPU 101.

A hard disk drive (HDD) 103, a graphic processor 104, an input interface 105, a drive device 106, and a communication interface 107 are connected to the bus 108.

The HDD 103 magnetically writes and reads data to and from the internal disk. The HDD 103 is used as a secondary storage device for the information processor 10. The HDD 103 stores the OS program, application program, and various types of data. A semiconductor storage device such as a flash memory may also be used as the secondary storage device.

A monitor 104a is connected to the graphic processor 104. The graphic processor 104 displays images on the screen of the monitor 104a according to instructions from the CPU 101. The monitor 104a may be a cathode ray tube (CRT) display device, liquid crystal display device, or the like.

The keyboard 105a and mouse 105b are connected to the input interface 105. The input interface 105 sends signals from the keyboard 105a and mouse 105b to the CPU 101. The mouse 105b is an example of a pointing device, and another pointing device may be used. Another pointing device may be, for example, a touch panel, tablet, touch pad, trackball, or the like.

The drive device 106 reads data recorded on, for example, an optical disc, on which data has been recorded so that the data can be read through optical reflection, or a portable recording medium such as a universal serial bus (USB) memory. For example, when the drive device 106 is an optical drive device, the drive device 106 reads data recorded on an optical disc 200 using laser light or the like. The optical disc 200 may be a Blu-ray® disc, digital versatile disc (DVD), DVD-RAM, compact disc-read only memory (CD-ROM), compact disc-rewritable (CD-RW), or the like.

The communication interface 107 is connected to a network 50. The communication interface 107 sends and receives data to and from another computer or communication device via the network 50.

The processing functions of this embodiment can be implemented in the above hardware configuration.

As described above, the information processor 10 can make string movements and interference adjustments at the same time. Overlaps in the strings can therefore be removed in a simple manner.

The focus 31 is moved in a stepwise manner, and it is thus possible to bring the arrangement angle of a string as close to a horizontal angle of 0° or a vertical angle of 90° as possible. A reduction in the visibility can therefore be suppressed.

The size of a string is not decreased and a character in a string is not omitted, which also leads to the suppression of a reduction in the visibility.

The arrangement positions of the strings 22 are not interchanged, so that there is a match in the appearance between the circuit element model 21 and the circuit element to be fabricated.

In this embodiment, the arrangement of the strings 22 is changed, but the arrangement of symbols other than the strings may be changed. In this embodiment, a description is given of a case in which the strings 22 positioned on the periphery of the edge 21a of the rectangle overlap one another. However, the processing method of this embodiment can also be used in a case in which strings arranged within an arc overlap one another.

Second Embodiment

Next, an information processor of a second embodiment is described.

The information processor of the second embodiment is described below, mainly on differences from the above first embodiment, and descriptions of similar items are omitted.

The string arranging unit 13 of the information processor 10 of the second embodiment can set a plurality of focuses (two focuses in this embodiment) on the guideline 30.

Figure 8:
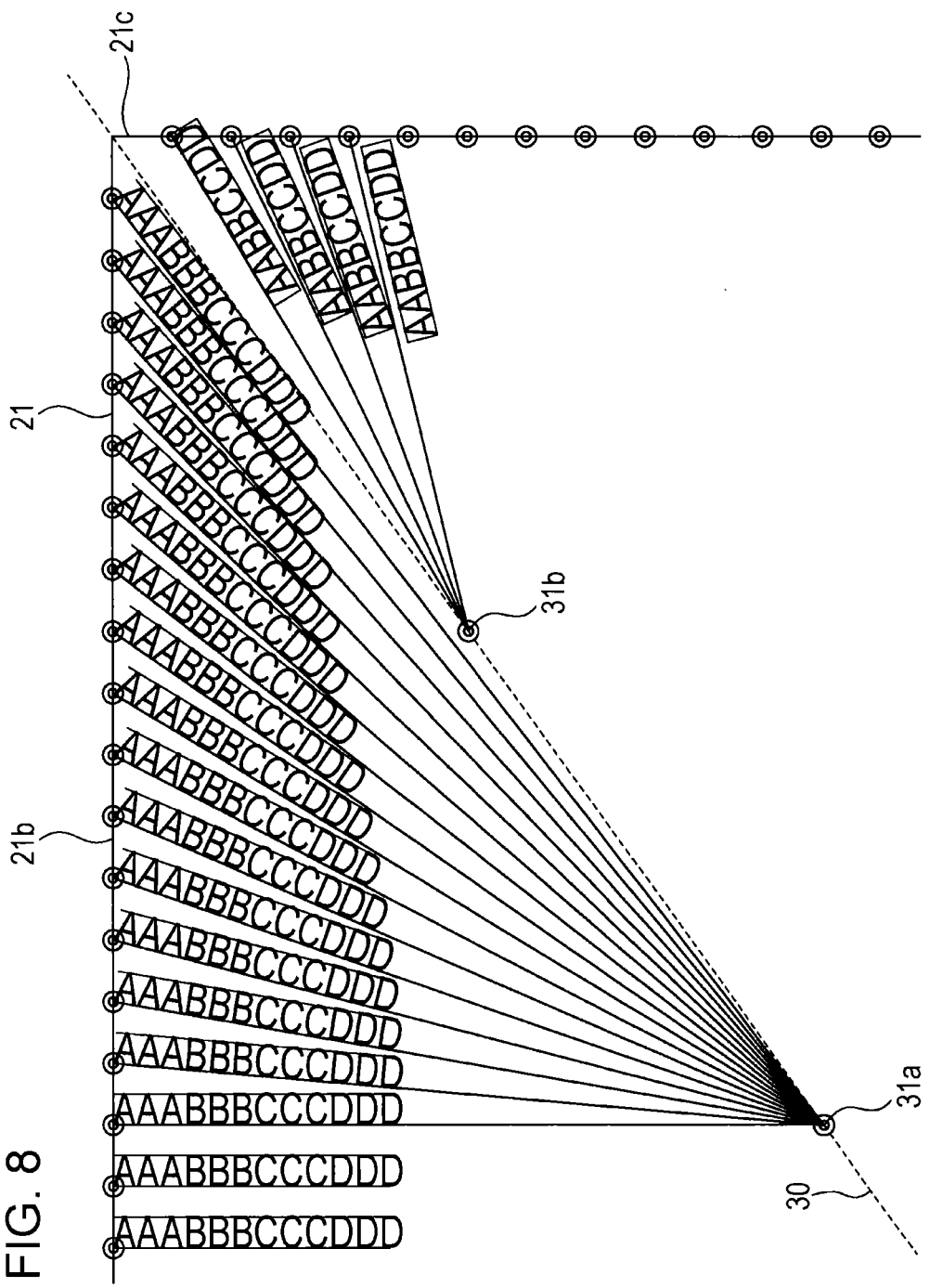
FIG. 8 illustrates string movements.

FIG. 8 illustrates string movements.

The string arranging unit 13 obtains the ratio between the number of strings 22 arranged on the side 21b of the circuit element model 21 and the number of strings 22 arranged on the side 21c. If the ratio is greater than or equal to a certain ratio, the string arranging unit 13 provides a focus 31a for the side 21b and a focus 31b for the side 21c on the guideline 30 separately. The focus moving unit 15 moves the focus 31a and the focus 31b independently, and determines angles at which the strings 22 do not overlap at the arrangement positions. The criterion for setting a plurality of focuses on the guideline 30 is not limited to the foregoing.

Next, processing of the information processor 10 of the second embodiment is described using a following method.

Figure 9:
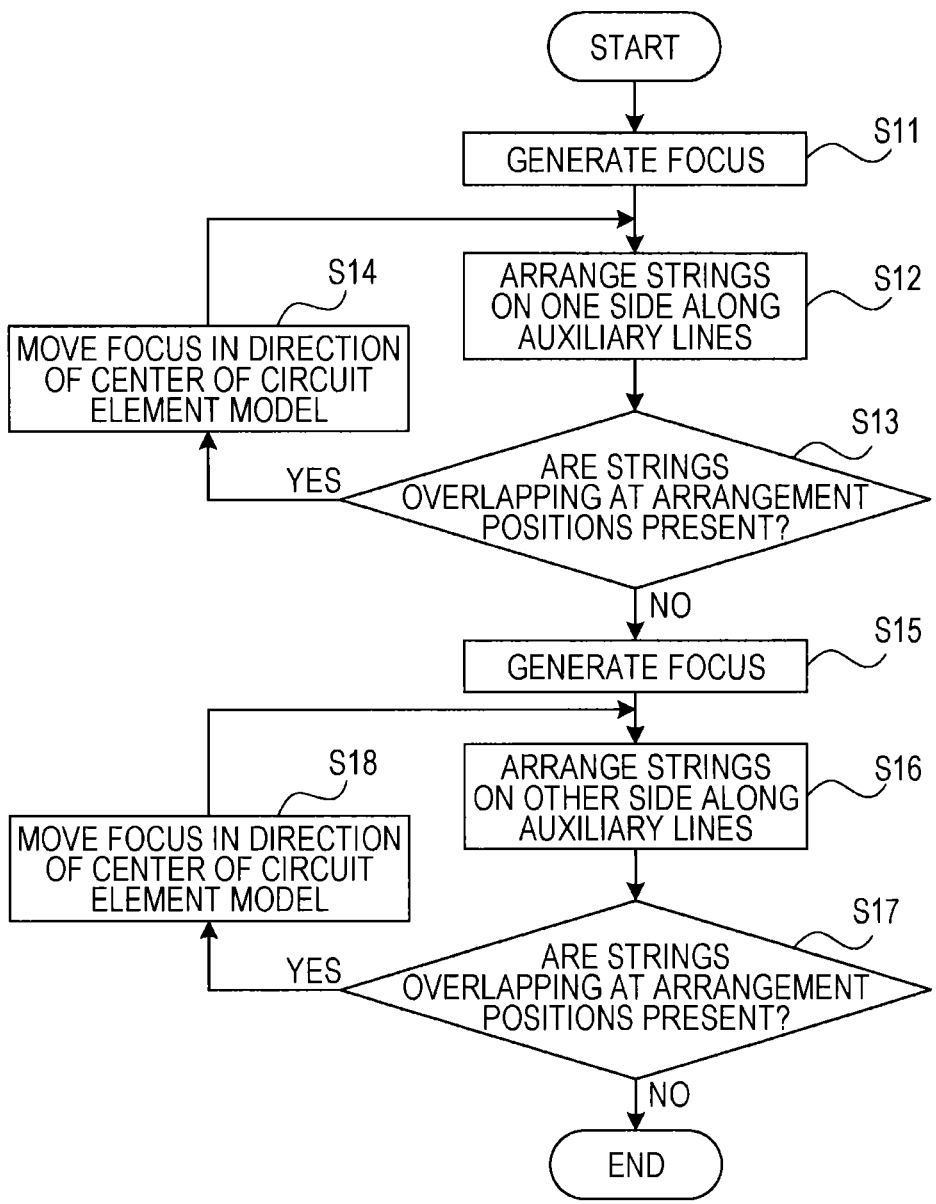
FIG. 9 is a method illustrating processing of an information processor of a second embodiment.

FIG. 9 is a method illustrating the processing of the information processor of the second embodiment.

Step S11: The string arranging unit 13 sets the guideline 30 on a diagonal line of the circuit element model 21 and generates the focus 31a on the set guideline 30. Then, the information processor 10 proceeds to step S12.

Step S12: The string arranging unit 13 sets the auxiliary line 32 from the contact point 24 of each string 22 on one side and the circuit element model 21 to the focus 31a, and arranges the strings 22 along the set auxiliary lines 32. Then, the information processor 10 proceeds to step S13.

Step S13: The deciding unit 14 decides whether strings 22 that overlap at the arrangement positions are present. If such strings 22 are present (Yes to step S13), the information processor 10 proceeds to step S14. If no such strings 22 are present (No to step S13), the information processor 10 proceeds to step S15.

Step S14: The focus moving unit 15 moves the focus 31a in the direction of the center of the circuit element model 21 by a predefined distance. Then, the information processor 10 proceeds to step S12.

Step S15: The string arranging unit 13 generates the focus 31b on the set guideline 30. Then, the information processor 10 proceeds to step S16.

Step S16: The string arranging unit 13 sets the auxiliary line 32 from the contact point 24 of each string 22 on the other side and the circuit element model 21 to the focus 31b, and arranges the strings 22 along the set auxiliary lines 32. Then, the information processor 10 proceeds to step S17.

Step S17: The deciding unit 14 decides whether strings 22 that overlap at the arrangement positions are present. If such strings 22 are present (Yes to step S17), the information processor 10 proceeds to step S18. If no such strings 22 are present (No to step S17), the information processor 10 terminates the processing illustrated in FIG. 9.

Step S18: The focus moving unit 15 moves the focus 31b in the direction of the center of the circuit element model 21 by a predefined distance. Then, the information processor 10 proceeds to step S16.

In this embodiment, the inclinations of the strings 22 arranged along the side 21b are adjusted, and then the inclinations of the strings 22 arranged along the side 21c are adjusted. This is not a limitation, however. The inclinations of the strings 22 may be adjusted using the processing method of the first embodiment, the focus 31b may be created, and then the inclinations of the strings 22 arranged along the side 21c may be adjusted.

The information processor 10 of the second embodiment provides the same effects as the information processor of the first embodiment.

The information processor 10 of the second embodiment enables the inclination angles of the strings 22 arranged along the side 21c to be smaller than the inclination angles of the strings 22 processed according to the processing in the first embodiment. A reduction in the visibility of the strings 22 can therefore be suppressed.

The string arrangement changing method, program, and information processor of the present disclosure are described above according to the embodiments illustrated in the drawings, but the present disclosure is not limited to the above embodiments. The configurations of the units may be replaced with any configurations that provide similar functions. Any other components or processes may be added to the present disclosure.

The present disclosure may be a combination of any of two or more configurations (features) in the above embodiments.

The above processing functions can be implemented on a computer. In this case, a program that contains the processing details of the functions of the information processor 10 is provided. When the program is run on the computer, the above processing functions are implemented on the computer. The program that contains the processing details can be recorded on a computer-readable recording medium. The computer-readable recording medium may be a magnetic storage device, optical disc, magneto-optical recording medium, semiconductor memory, or the like. The magnetic storage device may be a hard disk drive, flexible disk (FD), magnetic tape, or the like. The optical disc may be a DVD, DVD-RAM, CD-ROM/RW, or the like. The magneto-optical recording medium may be magneto-optical disk (MO) or the like.

To distribute the program, for example, portable recording media such as DVDs or CD-ROMs on which the program have been recorded are sold. The program may be stored in a storage device in a server computer, and transferred from the server computer to other computers via a network.

A computer to be used for running the program stores, in a storage device in that computer, the program recorded on a portable recording medium or transferred from the server computer, for example. The computer reads the program from the storage device in the computer and performs processing according to the program. The computer may read the program directly from the portable recording medium and perform the processing according to the program. In addition, each time the program is transferred from the server computer connected via the network, the computer may perform the processing sequentially according to the received program.

At least part of the above processing functions may be implemented on an electronic circuit such as a digital signal processor (DSP), application specific integrated circuit (ASIC), or programmable logic device (PLD).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method for changing an arrangement of strings of signal names that are arranged along an inner periphery of a rectangular circuit symbol, the method comprising:
   causing one or more processors to perform:
   setting a guideline on a diagonal of the rectangular circuit symbol and generating a focus on the guideline;
   for each string, setting an auxiliary line from a contact point of the string with a side of the rectangular circuit symbol to the focus and arranging the string along the auxiliary line such that the strings are arranged in a radial pattern from the focus;
   determining whether overlapping strings are present within the radial pattern; and
   when overlapping strings are present within the radial pattern, moving the focus in a direction to a center of the rectangular circuit symbol and rearranging the strings along the respective auxiliary lines.

2. The method according to claim 1, wherein the focus is moved in the direction to the center of the rectangular circuit symbol until all overlapping strings are removed.

3. The method according to claim 1, wherein a shape of the inner periphery includes line segments that are orthogonal to each other and one reference point is set for each of the orthogonal line segments.

4. The method according to claim 1, wherein the strings are formed perpendicularly to the inner periphery prior to being arranged along the respective auxiliary lines.

5. The method according to claim 4, wherein the strings are arranged along the inner periphery at equal spaces prior to being arranged along the respective auxiliary lines.

6. The method according to claim 1, wherein a shape of the inner periphery further includes a circular arc, or line segments that are orthogonal to each other.

7. The method according to claim 1, wherein it is determined whether overlapping strings are present only within a rectangle formed by the focus, contact points of two perpendicular lines from the focus to two sides of the rectangular circuit symbol, and a contact point of the two sides of the rectangular circuit symbol.

8. The method according to claim 1, wherein it is determined that overlapping strings are present within the radial pattern, the focus is moved in the direction to the center of the rectangular circuit symbol along the guideline.

9. The method according to claim 1, wherein it is determined that overlapping strings are present within the radial pattern, the focus is moved in the direction to the center of the rectangular circuit symbol along a line other than the guideline.

10. A non-transitory computer readable recording medium having stored therein a program for causing a computer to execute a process of changing an arrangement of strings of signal names that are arranged along an inner periphery of a rectangular circuit symbol, the process comprising:
    setting a guideline on a diagonal of the rectangular circuit symbol and generating a focus on the guideline;
    for each string, setting an auxiliary line from a contact point of the string with a side of the rectangular circuit symbol to the focus and arranging the string along the auxiliary line such that the strings are arranged in a radial pattern from the focus;
    determining whether overlapping strings are present within the radial pattern; and
    when overlapping strings are present within the radial pattern, moving the focus in a direction to a center of the rectangular circuit symbol and rearranging the strings along the respective auxiliary lines.

11. An information processor comprising:
    a processor; and
    a memory coupled to the processor, wherein the processor executes a process that includes:
    receiving data of a graphic having strings of signal names that are arranged along an inner periphery of a rectangular circuit symbol;
    setting a guideline on a diagonal of the rectangular circuit symbol and generating a focus on the guideline;
    for each string, setting an auxiliary line from a contact point of the string with a side of the rectangular circuit symbol to the focus and arranging the string along the auxiliary line such that the strings are arranged in a radial pattern from the focus;
    determining whether overlapping strings are present within the radial pattern; and
    when overlapping strings are present within the radial pattern, moving the focus in a direction to a center of the rectangular circuit symbol and rearranging the strings along the respective auxiliary lines.

* * * * *